United States Patent
Castro

[15] 3,687,302
[45] Aug. 29, 1972

[54] MACHINE FOR FORMING TIED STACKS OF BALES

[72] Inventor: Manuel A. Castro, P.O. Box 193, Banta, Calif. 95304

[22] Filed: June 17, 1971

[21] Appl. No.: 154,006

[52] U.S. Cl.....................214/6 B, 198/27, 214/519
[51] Int. Cl..............................................B65g 57/32
[58] Field of Search.......198/24, 27; 214/6 B, 7, 518, 214/519

[56] References Cited

UNITED STATES PATENTS

| | | | |
|---|---|---|---|
| 3,385,456 | 5/1968 | Snider | 214/6 B |
| 3,402,832 | 9/1968 | Wehde | 214/6 B |
| 3,481,497 | 12/1969 | Butler | 214/6 B X |

*Primary Examiner*—Robert J. Spar
*Attorney*—Julian Caplan et al.

[57] ABSTRACT

A commercially available automatic bale stacking machine is modified to facilitate forming a tied stack, i.e., a stack in which bales in some of the layers are oriented in different directions, to make the stack more stable when lifted by a fork truck or transported in a flat-bed truck. Bales are lifted from the ground by a loader which is located on one side of the machine in operative position and deposited on a stationary first bed which has a transverse conveyor capable of positioning two bales end-to-end. A superstructure extending above the first bed pivotally mounts an arm which swings in a vertical plane as controlled by a hydraulic cylinder and has a pusher bar on its lower end to push bales from the first table to a rearwardly disposed second table. A first actuating lever by means of a valve actuating linkage starts operative or rearward movement of the pusher bar when two bales are in position on the first table. A second actuating lever commences the retractive or forward movement of the bar when the bales have been transferred to the second table. A third actuating lever holds the bar stationary in retracted or neutral position until the first lever is actuated. The second and third tables of the machine pivot substantially as in the commercial machine. The second table has projectable and retractable spikes which function with other mechanisms to turn the bales 90° under control of the operator.

9 Claims, 13 Drawing Figures

PATENTED AUG 29 1972

INVENTOR.
Manuel A. Castro
BY
Attorney

INVENTOR.
Manuel A. Castro
BY
Attorney

PATENTED AUG 29 1972 3,687,302

INVENTOR.
Manuel A. Castro
BY
Attorney

MACHINE FOR FORMING TIED STACKS OF BALES

This invention relates to a new and improved machine for forming tied stacks of bales. Bales are deposited by baling machines in the field in rows following the path of the baler. In a type of baler commonly used in Western United States, bales produced have a length of 48 inches, a width of 24 inches and a height of 18 inches. Generally, the bales are deposited on one of their 18 × 48 inch faces. It is a feature of the present invention that a machine is provided which lifts the bales from the ground, elevates them to the first of three beds of the machine and arranges them on the second bed in different patterns with each bale lying on one of its 24 × 48 inch faces, the layer being 96 × 96 × 18 inches, all as hereinafter described.

The present invention is an improvement upon a commonly used machine known as the New Holland automatic bale wagon, such as is shown in Grey U.S. Pat. No. 2,848,172.

It is a principal purpose of the present invention to provide means for transferring one or two bales from a first to a second table in such a stack loader without tipping the bales and without the necessity of providing mechanism for tilting the first table. In other words, the bales are lifted from the ground and deposited on the first table extending transversely across the machine. From the first table, means is provided for moving the bales without tipping them onto the second table. Such a second table is subsequently tilted to form a tier of bales on a third table. When the stack is completed, the third table is tilted and the stack of bales is deposited in a field or other convenient location.

Another feature of the invention is the provision of means for automatically actuating a valve which controls the pusher bar which pushes the bales from the first table to the second table.

More specifically, the invention provides a first actuating lever located at the side of the first table opposite the loader, which is moved by the first bale when a second bale is forced into proper position on the first table. A linkage is provided to open the control valve in a first direction so as to move the pusher bar actuating mechanism in a rearward direction to push the bales onto the second table. A second actuating lever is located in proximity to the second table and is actuated after the bales have been deposited on the second table by an arm on the pusher bar to reverse the control valve so as to retract the pusher bar and move it forwardly. A third actuating lever is located at the front edge of the first table and is pivoted by the pusher bar when it returns to fully retracted position. A linkage is provided to move the control valve to a neutral position to hold the bar stationary until another pair of bales has been deposited on the first table.

Another feature of the invention is the provision of means cooperable with the pusher bar to turn certain bales 90° under the control of the operator without the operator leaving the cab. This is an important feature of the invention in that it enables "tied" stacks to be formed without the operator having to turn bales. Tied stacks are desirable in that they stabilize the stack and satisfy highway department requirements for transporting stacks of bales along highways on flat bed trucks.

Another feature of the invention is the provision of conveyor means which permits moving the bales off of the chain lugs without damaging the bale wire.

Another feature of the invention is the provision of an opening in the first table to provide clearance when the loader is lifted to transport position. A shoe is movable with the loader to block an opening in the first table when the loader is in operative position.

Other objects of the present invention will become apparent upon reading the following specification and referring to the accompanying drawings in which similar characters of reference represent corresponding parts in each of the several views.

The machine of the present invention has a ground supported frame having longitudinal and transverse members 21 some of which are illustrated herein. At the forward right-hand end of the machine is a cab 22 having a seat for the operator and various controls (not shown). The major portions of the machine are a loader 23 at the left forward end of the machine, a transversely extending horizontal first table 24 immediately opposite the loader, a second table 26 rearward of the first table, a ramp 28 between the first table and second table, and third table (not shown) rearward of the second table. The loader 23 lifts the bales from the ground, deposits each bale upon the first table; and in accordance with the present invention, a pair of bales (although sometimes only a single bale) are then pushed rearwardly over the ramp 28 to the second table 26 and this operation is repeated to form a layer of eight bales. The second table 26 tilts 90° to deposit the layer of bales as a vertical tier upon the third table. Repetition of the preceding operations results in a stack formed on the third table. The machine is driven to the point of deposit, whereupon the third table is tilted and the load is placed on the ground. Such load is a stack of seven layers of eight bales each.

Figure 2:
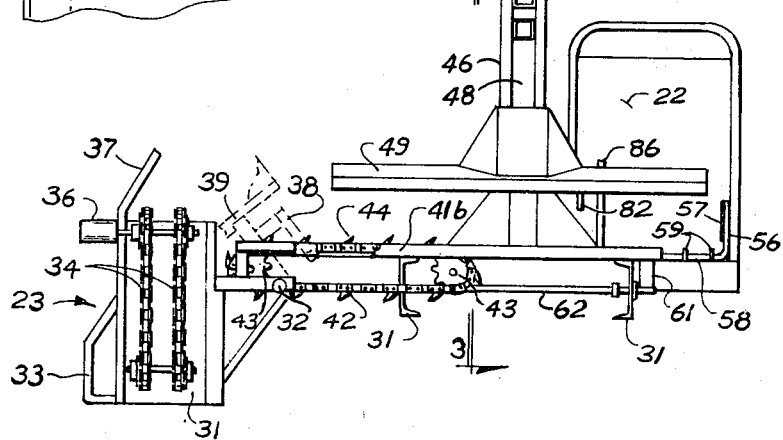
FIG. 2 is a transverse, vertical sectional view taken substantially along the line 2—2 of FIG. 1.
Figure 3:
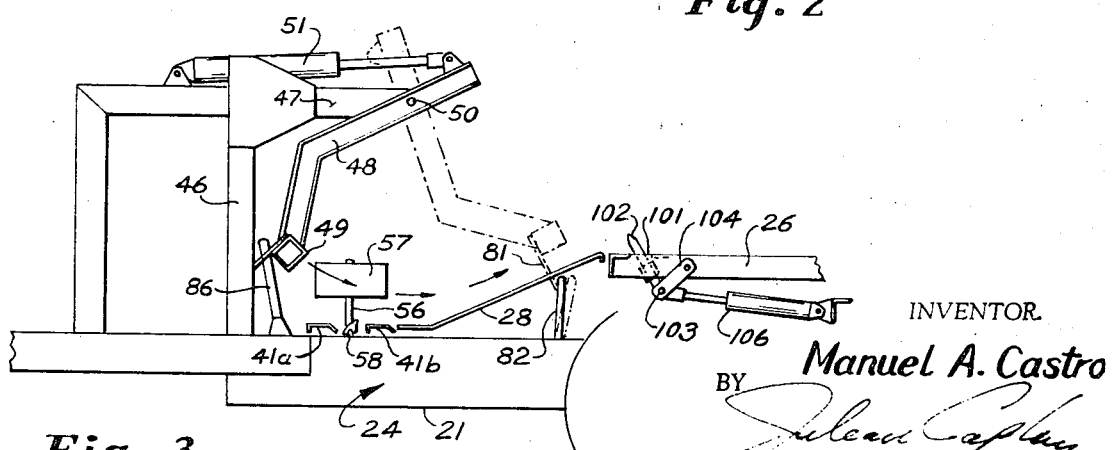
FIG. 3 is a sectional view taken substantially along line 3—3 of FIG. 2.

Directing attention first to the loader 23, said loader has a frame 31 pivoted to the second table by horizontal, longitudinal pivots 32 so that the loader may be pivoted from the operative, solid line position of FIG. 2, to an inoperative or transport (dotted line position) which lessens the overall width of the machine and enables it to occupy a narrower space on a highway. At the forward, lower level of loader 23 are forwardly diverging pick-up guides 33 which direct bales into the frame 31. The back of the frame has conveyor chains 34 provided with lugs and driven by motor 36 which engage each bale and lifts it vertically upward. A turn guide 37 turns the bale onto the first table 24 so that it pivots 90° and is deposited on the first table on one of its 24 × 48 inch faces. An opening formed in table 24 in the operative position of the loader is filled by a shoe 38 supported from the loader frame 31 by bracket 39. When the loader 23 is in lifted position, the shoe is retracted and the opening in the table 24 provides clearance for parts of the loader. If it were not for the shoe 38, a gap in the first table would cause the bales to hang therein.

First table 24 is provided with horizontal, transversely extending forward and rearward slides 41a, 41b, respectively, the opening in the first table heretofore referred to being formed in the slide 41b. A transverse conveyor chain 42 moves in the space between the slides 41a, 41b and extends from the point of deposit of the bales from loader 23 to a position to the left of the center of the first table. Chain 42 is driven by sprockets 43 at either end by a motor (not shown). Chain 42 has lugs 44 which are bevelled so that bales may be pushed off the first table without the lugs cutting the baling wires on the underside of the bale.

Extending from a position forward of the first table upwardly and then rearwardly is a superstructure 46 having a horizontal rearward extending bracket 47. A dogleg arm 48 is pivoted to bracket 47 by means of horizontal, transverse pivots 50. Arm 48 has a transversely extending horizontal pusher bar 49 at its lower end. Hydraulic cylinder 51 is mounted on super-structure 46 and its rod connected to arm 48. Cylinder 51 is controlled by valve 52 which is physically located below ramp 28 and which is changed in position by upward extending valve lever 53. Lever 53 is biased in a counterclockwise direction about its pivot 55, as viewed in FIG. 6A by spring 54. The movement of lever 53 is controlled as hereinafter appears in detail.

Figure 1:
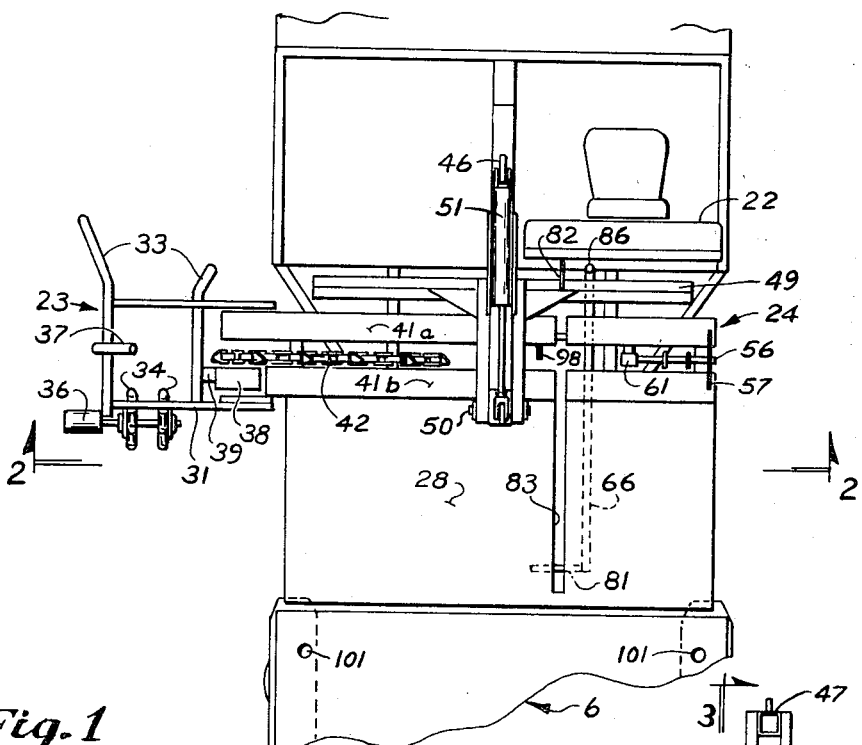
FIG. 1 is a top plan view of the front end of a machine in accordance with the present invention.
Figure 4:
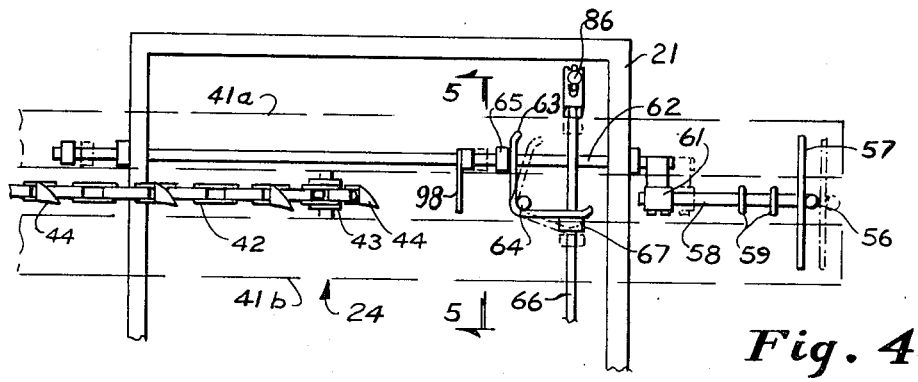
FIG. 4 is an enlarged plan view of a portion of the first table with parts broken away to reveal construction below the level of said table.

First valve actuating lever 56 extends vertically upward at the right-hand end of the first table and preferably has a longitudinal, vertical plate 57 which is contacted by the first bale of a pair of bales deposited on table 24. The second bale of the pair is moved by conveyor chains 42 to push the first bale to the right until it forces first actuating lever 56 to the right as viewed in FIGS. 1, 2 and 4. Lever 56 is in fact an upward extension of horizontal, transverse first rod 58 which is guided by guides 59 and other means for horizontal, transverse reciprocation. The left end of rod 58 is fixed to downward-forward slanted, offset connector 61 which is fixed to second transverse horizontal rod 62 (see FIG. 4). Rod 62 extends almost to the left end of the first table 24. Valve crank 63 is pivoted about vertical pivot 64 and the ends of the valve crank are bifurcated. Collar 65 on rod 62 engages the outside of one end of the lever 63. Horizontal longitudinal first table actuating rod 66 has a collar 67 which is engaged by the other end of lever 63. Thus, when first actuating lever 56 is pushed to the right as viewed in FIG. 4, the collar 65 on rod 62 moves the lever 63 from solid line to dotted line position and this causes rearward movement of rod 66.

Figure 6A:
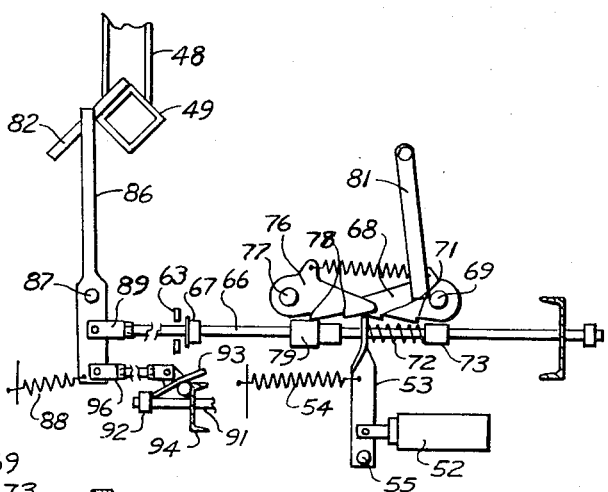
FIGS. 6A, 6B and 6C are schematic, enlarged elevational views of portions of the valve actuating mechanism shown in different positions of the cycle of operation of the machine.
Figure 6B:
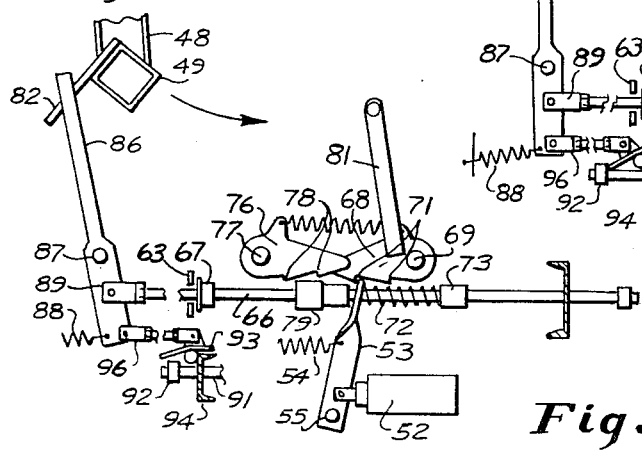
Figure 6C:
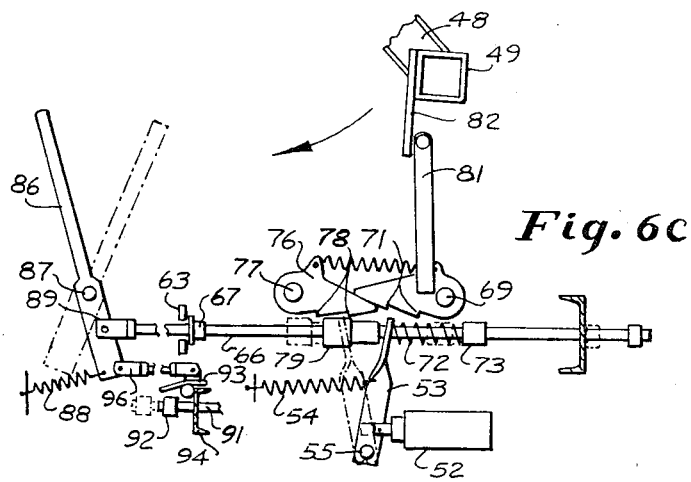
Figure 7:
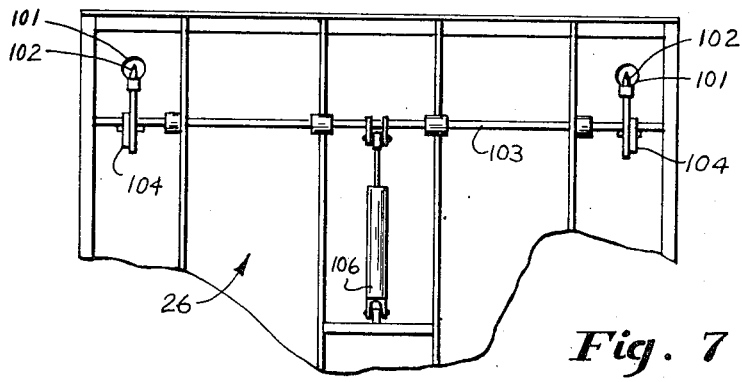
FIG. 7 is a fragmentary view of the underside of the second table.

Directing attention now to FIGS. 6A–6C inclusive, mounted above rod 66 and in close proximity to valve lever 53 is first latch 68, which is pivoted about horizontal transverse pivot 69. The undersurface of latch 68 has notches 71 which may engage the upper end of lever 53. Spring 72 around rod 66 and abutting collar 73 on rod 66 bear against the right-hand side of lever 63 as viewed in FIG. 6A. Forwardly of first latch 68 is second latch 76 which is pivoted about another horizontal transverse pivot 77 and has notches 78 on its undersurface. A stepped collar 79 is fixed to rod 66 below latch 76.

Second actuating lever 81 is attached to latch 68. A contactor arm 82 is fixed to pusher bar 49 and the ramp 28 is formed with a longitudinal slot 83 so that as the pusher bar 49 approaches extreme rearward position, arm 82 engages lever 81 and lifts latch 69, so that the latch is disengaged from lever 53.

Third actuating lever 86 extends substantially vertically at the forward edge of the first table 24. As best shown in FIG. 6A, lever 86 is pivoted about horizontal transverse pivot 87 and at its lower end is biased by spring 88 in a clockwise direction. Lever 86 is connected below pivot 87 by connector 89 to the forward end of rod 66. When bar 49 moves to forward position, it contacts lever 86 and pivots the same counterclockwise, thereby forcing rod 66 rearward.

In accordance with regular operation of the New Holland automatic bale wagon, after a layer of bales has been deposited on the second table 26, the second table is tilted from horizontal to vertical position about a transverse horizontal pivot axis located at the rear of said second table. Such movement is controlled by reciprocation of second table rod 91 (see FIGS. 6A–6C) by means forming no part of the present invention. To insure that the second table 26 does not tilt while the pusher bar 49 is moving, as best shown in FIG. 6A, rod 91 is provided with a collar 92 which may be engaged by the forward end of a trip lever 93 which is pivotally mounted on a horizontal transverse axis on bracket 94 which is attached to a stationary portion of the machine. Link 96 interconnects the lower end of third actuating lever 86 and a lug on trip lever 93. When lever 86 is in forward or completely retracted position, link 96 pulls trip lever 93 in a counterclockwise direction so that it engages rearward of collar 92 and prevents rearward movement of rod 91. However, when the actuating lever 86 is in fully retracted position shown in solid lines in FIG. 6C, the trip lever 93 is removed from contact with collar 92, thereby preventing the rod 91 from moving rearwardly, and, by means forming no part of the present invention, tilting the second table.

Figure 5:
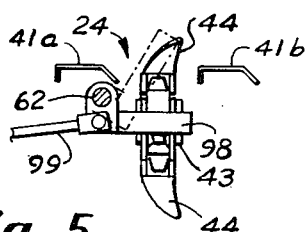
FIG. 5 is a fragmentary sectional view taken substantially along the line 5—5 of FIG. 4.

In the formation of a tied stack, it is sometimes necessary to move a bale only partially across the first table (i.e., to the mid-position of the table) and to use the pusher bar 49 to move the single bale rearwardly, all as hereinafter explained. To perform this function, rod 62 is provided with a stop 98 which is fixed longitudinally relative to the rod 62 but can pivot between solid-line or inoperative position in FIG. 5 to dotted-line or operative position. The pivoting of stop 98 is controlled by lever 99 which is moved by the operator from the cab 22. When the stop 98 is retracted as shown in solid position, bales slide on slides 41a, 41b of the first table 24 out of contact with the stop. However, when the lever 99 is actuated so that the stop 98 is in dotted-line position projecting above the level of slides 41a, 41b, a bale moving from left to right, as viewed in FIG. 4, encounters the stop 98 and thus moves the rod 62 to the right. This is the same practical effect as when the two bales of a normal pair engage the plate 57 or first actuating lever 56, and the movement of the rod 62 to the right initiates the rearward or pushing movement of pusher bar 49 as previously has been explained.

During the formation of a tied layer of bales, two bales deposited on ramp 28 are turned 90° by the rearward pushing of one or more centrally disposed subsequent bales. The pivoting is accomplished by forcing the inner ends of the bales rearwardly while holding the outer ends of the bale against rearward movement. Such holding is accomplished by spikes 102 which are normally retracted below the level of second table 26 but at certain points in the sequence of operation are projected through holes 101 above said level and impale bales located above holes 101. The spikes are mounted on the outer ends of brackets 104 which are fixed to horizontal transverse rod 103. Rod 103 is oscillated by means of a crank 107 fixed thereon and actuated by hydraulic cylinder 106. The operator moves a lever (not shown) in the cab to shift the valve (not shown) which controls actuation of cylinder 106 at certain times in the sequence of operation to project the spikes 102 to impale the bales super-imposed thereon. The same operating lever which controls cylinder 106 also through a leakage moves lever 99.

Figure 8A:
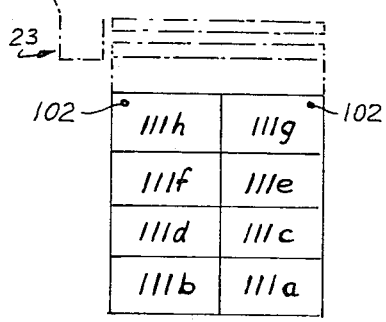
FIG. 8A is a schematic plan view of the first, second, fourth and seventh layers of a stack formed by the machine.
Figure 8B:
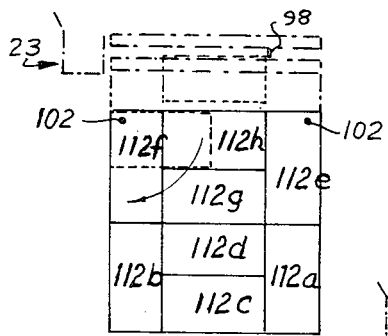
FIG. 8B is a view similar to FIG. 8 showing the third and sixth layers.
Figure 8C:
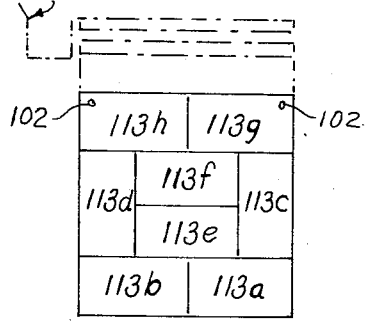
FIG. 8C is a view similar to FIG. 8A of the fifth layer.
Figure 9:
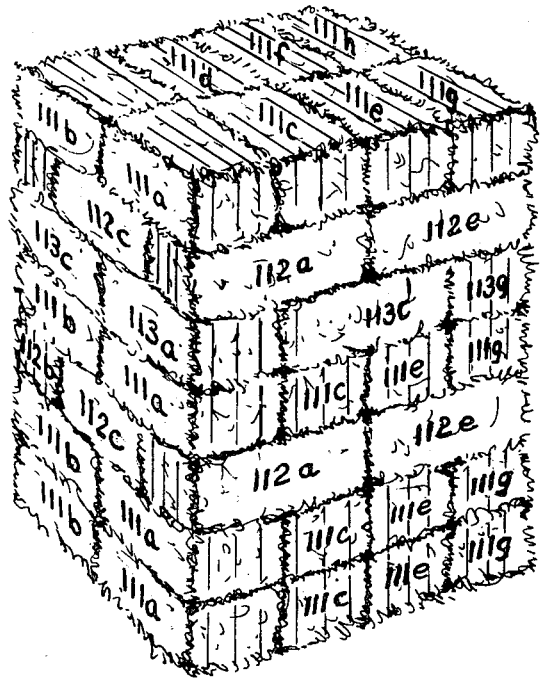
FIG. 9 is a perspective view showing a stack formed in accordance with this invention.

FIGS. 8A–8C illustrate the patterns of certain layers of the ultimate stack FIG. 9. Thus, FIG. 8A illustrates the first, second, fourth and seventh layer of bales. FIG. 8B illustrates the third and sixth layers and FIG. 8C illustrates the fifth layer although the sequence may be varied.

To form the layer shown in FIG. 8A, the first bale 111a of the first pair of bales is raised by loader 23 from the ground, turned inward by guide 37 and deposited on first table 24 on one of its 24 × 48 inch faces. Conveyor 42 moves bale 111a partially to the right across the first table. Meanwhile, the second bale 111b of the first pair follows bale 111a and pushes the bale 111a the remainder of the distance across the first table 24 so that the right-hand end of bale 111a contacts plate 57 and pushes lever 56 to the right as viewed in FIG. 1. Such movement pushes rod 66 rearwardly from the position of FIG. 6A to the position of FIG. 6B whereby collar 79 pushes valve lever 53 clockwise and latches the same behind first latch 68 in first position. Valve 52 energizes cylinder 51, causing the pusher bar 49 to move rearwardly and push the first pair of bales 111a, 111b rearwardly over ramp 28 and ultimately onto second table 26.

As the bar 49 approaches its full rearward position, the contactor arm 82 fixed thereto engages second actuating lever 81, causing the same to swing in a counterclockwise direction and lift the first latch 68 from engagement with lever 53. Spring 54 then moves the lever 53 out of first position in a counterclockwise direction, pulling the rod 66 forwardly by reason of lever 53 forcing collar 79 forwardly until the upper end of lever 53 latches under second latch 73 in second position. In this position, valve 52 is positioned so that the cylinder 51 causes retractive or forward movement of bar 49. Forward movement continues until bar 49 engages the third actuating lever 86 and pivots the same in a counterclockwise direction to neutral position. Lever 86 pulls rod 66 further forwardly and stepped collar 79 pivots second latch 76 permitting lever 53 to return to full-up or solid line third position of FIG. 8A. In third position of lever 53, the valve 52 is in neutral and the cylinder 51 is not energized, permitting the pusher bar 49 to remain in full retracted position. Bar 49 remains in neutral position until movement of another bale on first table 24 initiates another cycle of movement of said pusher bar.

The first pair of bales 111a, 111b is followed by a second pair of 111c, 111d and as these bales are moved rearwardly, they push bales 111a, 111b rearwardly a corresponding distance. A third pair 111e, 111f then follows and finally the pair 111g, 111h completes the lowermost level of the stack of FIG. 9. When the pusher bar 49 has returned to neutral position, trip lever 93 is elevated to the position shown in FIG. 6C permitting second table rod 91 to be moved rearwardly under the control of valve (not shown) actuated by the operator or by automatic means. By means forming no part of this invention and not illustrated herein, the second table 26 tilts, depositing the first layer as a vertical tier on the third table (not shown).

In the form of stack shown in FIG. 9, a second layer is formed identical with the first layer illustrated in FIG. 8A and as this layer is deposited on the third table it moves the first layer rearwardly thereof.

To form the third layer shown in FIG. 8B, the first pair of bales 112a, 112b are deposited in the same manner as in the first layer. Thereupon, the operator energizes cylinder 106 causing the spikes 102 to project and impale the outer forward corners of these bales and this also moves lever 99, causing bale stop 98 to rise to the dotted-line position of FIG. 5.

A bale 112c has been lifted by loader 23 and deposited on first table 24. Under the influence of conveyor 42 bale 112c moves to the right as viewed in FIG. 4 until its right-hand end contacts stop 98, which causes the rod 62 to move to the right and commences the movement of pusher bar 49 rearwardly. As bale 112c moves rearwardly, centered on the first table, it encounters the forward inner corners of bales 112b and 112c and turns them rearwardly. The pusher bar 49 retracts to forward position and the bale 112d is handled in the same manner as 112c. Bale 112d pushes bale 112c further rearwardly and completes the swinging movement of bales 112a and 112b, causing them to be aligned longitudinally with the bales 112c, 112d located inwardly thereof. Thereupon, spikes 102 and bale stop 98 are retracted. Bales 112e and 112f are deposited on the first table in the same manner as bales 112a and 112b were deposited, and are moved rearward and are impaled by spikes 102. Bale 112g is then moved in the same manner as 112c and bale 112h is moved in the same manner as 112d. As said bales 112e–h move rearward, they push the bales 112a–112d, inclusive, rearwardly a corresponding amount. The completed third layer is shown in FIG. 8B.

To form a tie layer such as shown in FIG. 8C, bales 113a, 113b are deposited on the second table in the same manner as bales 111a, 111b. Bales 113c, 113d are then deposited on the second table and their forward outside corner impaled by spikes 102. At the same time, the bale stop 98 is elevated. Hence the next bale 113e swings the inner ends of bales 113c outwardly rearwardly and when said bale 113e is pushed rearwardly by the subsequent bale 113f the bales of 113c, 113d complete their swinging movement to longitudinal direction. The final layers of the bale 113g, 113h are deposited in the same manner as 111a, 111b. Thus, the layer of FIG. 8C is completed.

As each layer of bales has been completed, it is tilted by the second table into a vertical tier. When seven layers, similar to the layers shown in FIG. 9, have been deposited on the third table, by means forming no part of the present invention, but well known in the operation of the machine heretofore described, the stack is tilted 90° and deposited on the ground, or other place of deposit. The dimensions of the completed stack are 8 by 8 feet and the height is seven layers, each 18 inches high. It will be understood that the patterns and sequence of the layers may be varied. Further, by modifications which will occur to one skilled in the art, different size bales may be accommodated.

What is claimed is:

1. A bale stacking machine of the type having a ground-supported frame, a first table extending transversely of said frame adjacent the front of said frame, a loader on a first side of said frame having means for lifting bales from the ground and depositing said bales one at a time on said first table extending transversely of said frame, a transverse conveyor on said first table to move bales toward a second side of said frame, a second table rearward of said first table, a ramp between said tables, a superstructure extending above and rearwardly over said first table, an arm, means pivotally mounting said arm on said superstructure for movement about a horizontal transverse axis, hydraulic means on said superstructure for swinging said arm, a valve controlling said arm having first, second and neutral positions, a valve arm controlling the positions of said valve, a horizontal transverse pusher bar on said arm to push one or more bales from said first table over said ramp onto said second table, a first actuating lever located on said first table at said second side of said frame, a transverse rod transversely movable by said first actuating lever, a longitudinally movable rod reciprocable in proximity to said valve arm, means articulately connecting said transversely and longitudinally movable rods together, first means connecting said longitudinally movable rod and said valve arm together to move said arm to move said valve to first position to energize said hydraulic means to swing said arm rearwardly, a second actuating lever adjacent said second table, a contactor movable with said pusher bar to move said second actuating lever, second means controlled by said second actuating lever to move said valve arm to move said valve to second position to energize said hydraulic means to swing said arm forwardly, a third actuating lever on the forward edge of said first table, said pusher bar contacting said third lever when in fully retracted position, third means controlled by said third lever to move said longitudinally movable rod to move said valve arm to move said valve to neutral position, whereby said pusher bar is held stationary in full forward position.

2. A machine according to claim 1 in which said means articulately connecting said transversely and longitudinally movable rods together comprises a bell crank having bifurcated ends, a pivot pivoting said crank relative to said frame and collars on said rods to cause said rods to move and said crank to pivot in unison.

3. A machine according to claim 1 which further comprises first and second latches engageable with said valve arm to latch said valve in first and second positions, respectively, and means associated with said second and third actuating levers to unlatch said first and second latches, respectively.

4. A machine according to claim 1 which further comprises a bale stop located on said transverse rod intermediate the ends of said first table and means operable to move said stop between an operative position above the level of said first table and an inoperative position, said stop in operative position being contacted by a transversely moving bale to move said valve to first position.

5. A machine according to claim 4 which further comprises a pair of spikes and means for projecting said spikes above the level of said second table at the locations of the outer forward corner of each of a pair of bales moved onto said second table by said pusher bar to impale said pair of bales and for retracting said spikes.

6. A machine according to claim 1 which further comprises a reciprocable second rod controlling tilting of said second table, a collar on said second rod, a third latch movable between operative position restraining movement of said second rod and inoperative position, and means interconnecting said third actuating lever and said third latch to permit movement of said second rod only when said valve is in neutral position.

7. A machine according to claim 1 in which said first table comprises a forward and rear transverse horizontal slide separated by a gap, said transverse conveyor located between said slides and projecting above said gap.

8. A machine according to claim 7 in which said conveyor has a chain and spaced lugs, said lugs slanted upward rearward so that wires on bales on said conveyor are lifted over said lugs when said pusher bar moves said bale rearwardly.

9. A machine according to claim 7 in which said loader is pivotally mounted on said frame about a longitudinal horizontal pivot, one said slide being interrupted adjacent said first side of said frame and which further comprises a shoe and means mounting said shoe on said loader whereby when said loader is in operative position said shoe fills the interrupted portion of said slide.

* * * * *